US012600023B2

(12) United States Patent
Lai

(10) Patent No.: US 12,600,023 B2
(45) Date of Patent: Apr. 14, 2026

(54) POWERED TOOL FOR REPAIRING TIRE

(71) Applicant: BASSO INDUSTRY CORP., Taichung (TW)

(72) Inventor: Tian-Chi Lai, Taichung (TW)

(73) Assignee: BASSO INDUSTRY CORP., Taichung (TW)

( * ) Notice: Subject to any disclaimer, the term of this patent is extended or adjusted under 35 U.S.C. 154(b) by 0 days.

(21) Appl. No.: 18/919,735

(22) Filed: Oct. 18, 2024

(65) Prior Publication Data

US 2025/0153331 A1 May 15, 2025

(30) Foreign Application Priority Data

Nov. 9, 2023 (TW) ................................ 112143188

(51) Int. Cl.
*B25F 5/00* (2006.01)
*B24B 47/12* (2006.01)
*B25F 5/02* (2006.01)

(52) U.S. Cl.
CPC ................ *B25F 5/001* (2013.01); *B25F 5/02* (2013.01); *B24B 47/12* (2013.01)

(58) Field of Classification Search
CPC ............. B25F 5/001; B25F 5/02; B24B 47/12
See application file for complete search history.

(56) References Cited

U.S. PATENT DOCUMENTS

2022/0040940 A1 2/2022 Jornlin et al.

FOREIGN PATENT DOCUMENTS

| | | |
|---|---|---|
| CN | 1419997 A | 5/2003 |
| CN | 102896620 A | 1/2013 |
| CN | 116572206 A | 8/2023 |

OTHER PUBLICATIONS

Search Report appended to an Office Action, which was issued to Taiwanese counterpart application No. 112143188 by the TIPO on Jan. 7, 2026, with an English translation thereof.

*Primary Examiner* — Michelle Lopez
(74) *Attorney, Agent, or Firm* — BURRIS LAW, PLLC

(57) ABSTRACT

A powered tool for repairing a tire includes an electric power unit, a control unit, a trigger unit, and a speed switching unit. The electric power unit includes a driven shaft adapted to output kinetic energy and a motor driving the driven shaft to rotate. The control unit includes an actuating switch operable to output an actuated signal associated with a movement distance of an actuator and a processing module configured to control rotation of the rotating member at one of first and second rotational speeds according to the actuated signal. The speed switching unit is operable to move between first and second rotational speed positions such that the actuator travels first or second distances as being pushed by the trigger unit.

13 Claims, 10 Drawing Sheets

POWERED TOOL FOR REPAIRING TIRE

CROSS-REFERENCE TO RELATED APPLICATION

This application claims priority to Taiwanese Invention Patent Application No. 112143188, filed on Nov. 9, 2023, the entire disclosure of which is incorporated by reference herein.

FIELD

The disclosure relates to a powered tool, and more particularly to a powered tool for repairing a tire.

BACKGROUND

A conventional tire repair tool disclosed in U.S. Patent Application Publication No. 20220040940 includes an outer casing, a motor mounted to the outer casing, a switch mounted to the outer casing and for activating the motor, a trigger mounted to the outer casing and operable to trigger the switch, an output shaft rotatably mounted to the outer casing for outputting kinetic energy, a transmission gear unit connected between the motor and the output shaft for transmitting kinetic energy, and a mode selector mounted to the outer casing and for changing a gear ratio of the transmission gear unit such that the output shaft rotates at two different rotational output speeds when being switched by the mode selector.

The output shaft may be connected to different tool heads for cleaning, grinding, or polishing a damaged region of a tire to be repaired so a patch may be securely bonded to the damaged region.

In order to provide additional rotational output speeds to the output shaft, the conventional tire repair tool of U.S. Patent Application Publication No. 20220040940 discloses in paragraphs [0034] and [0035] that the rotational output speed of the output shaft may be further controlled by an electronic speed control system. However, since the conventional tire repair tool is usually subjected to vibrations during use, connections among wires and contacts of the electronic speed control system are susceptible to loosen easily, which adversely affect reliability of the conventional tire repair tool.

SUMMARY

Therefore, an object of the disclosure is to provide a powered tool that can alleviate at least one of the drawbacks of the prior art.

According to the disclosure, a powered tool for repairing a tire includes a housing unit, an electric power unit, a control unit, an actuating unit, and a speed switching unit. The housing unit extends along an axis. The electric power unit is mounted to the housing unit, and includes a driven shaft and a motor. The driven shaft is rotatable and is adapted to output kinetic energy. The motor is for converting electrical energy into kinetic energy, and includes a rotating member that is rotatable and that drives rotation of the driven shaft. The control unit is mounted to the housing unit, and includes an actuating switch and a processing module. The actuating switch includes an actuator that is movable, and is operable to output an actuated signal that is associated with a movement distance of the actuator. The processing module is electrically connected to the actuating switch and the motor, and is configured to control rotation of the rotating member of the motor at one of a first rotational speed and a second rotational speed according to the actuated signal. The trigger unit is mounted to the housing unit, and includes a trigger operable to actuate movement of the actuator. The speed switching unit is mounted on the housing unit, and includes a speed changing switch operable to move relative to the trigger between a first rotational speed position and a second rotational speed position. The speed changing switch is distal from the trigger when being at the first rotational speed position such that the actuator travels a first distance as being pushed by the trigger. The speed changing switch is adjacent to the trigger, and is disposed between the trigger and the housing unit when being at the second rotational speed position such that the actuator travels a second distance that is smaller than the first distance as being pushed by the trigger.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
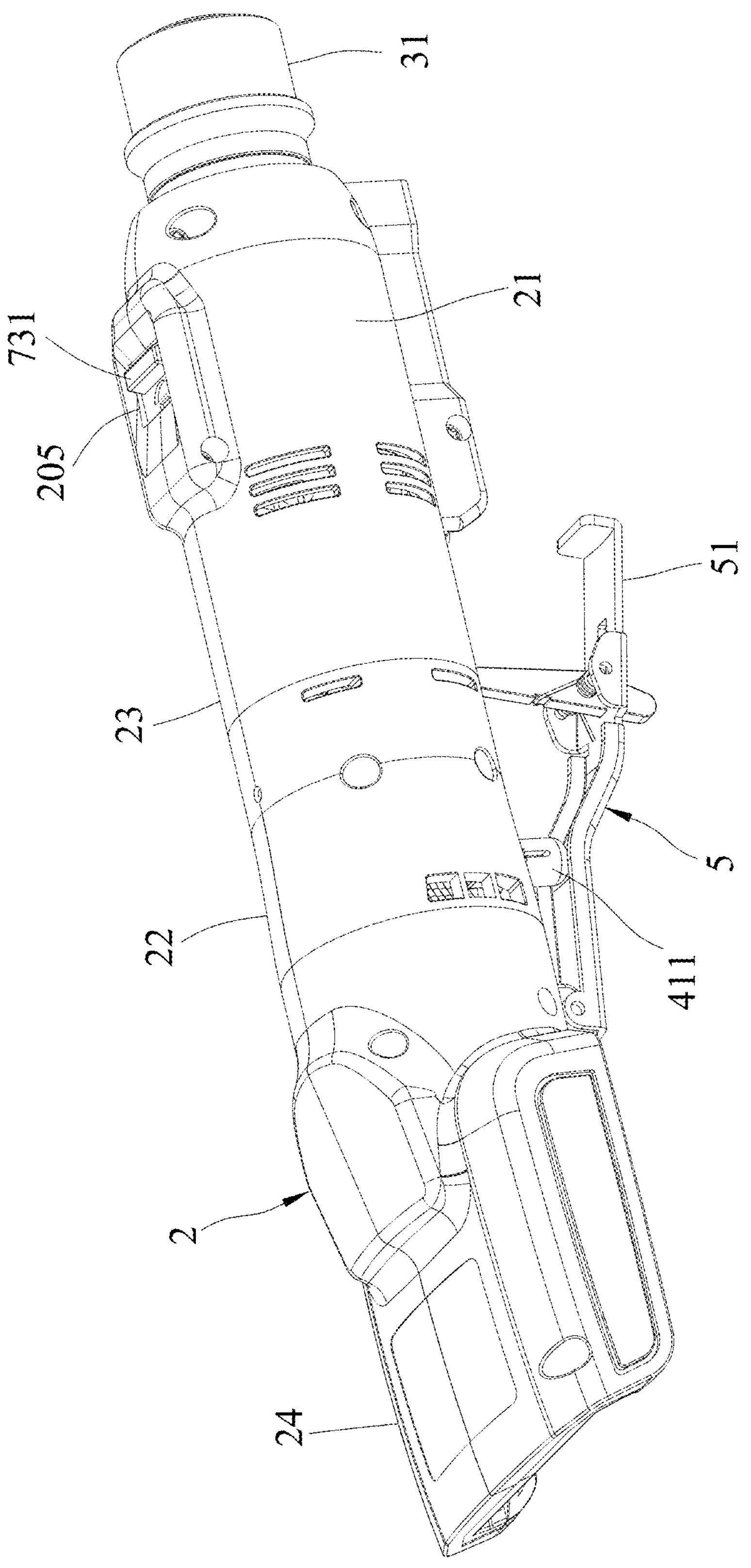
FIG. 1 is a schematic perspective view of an embodiment of a powered tool according to the present disclosure for repairing a tire.
Figure 2:
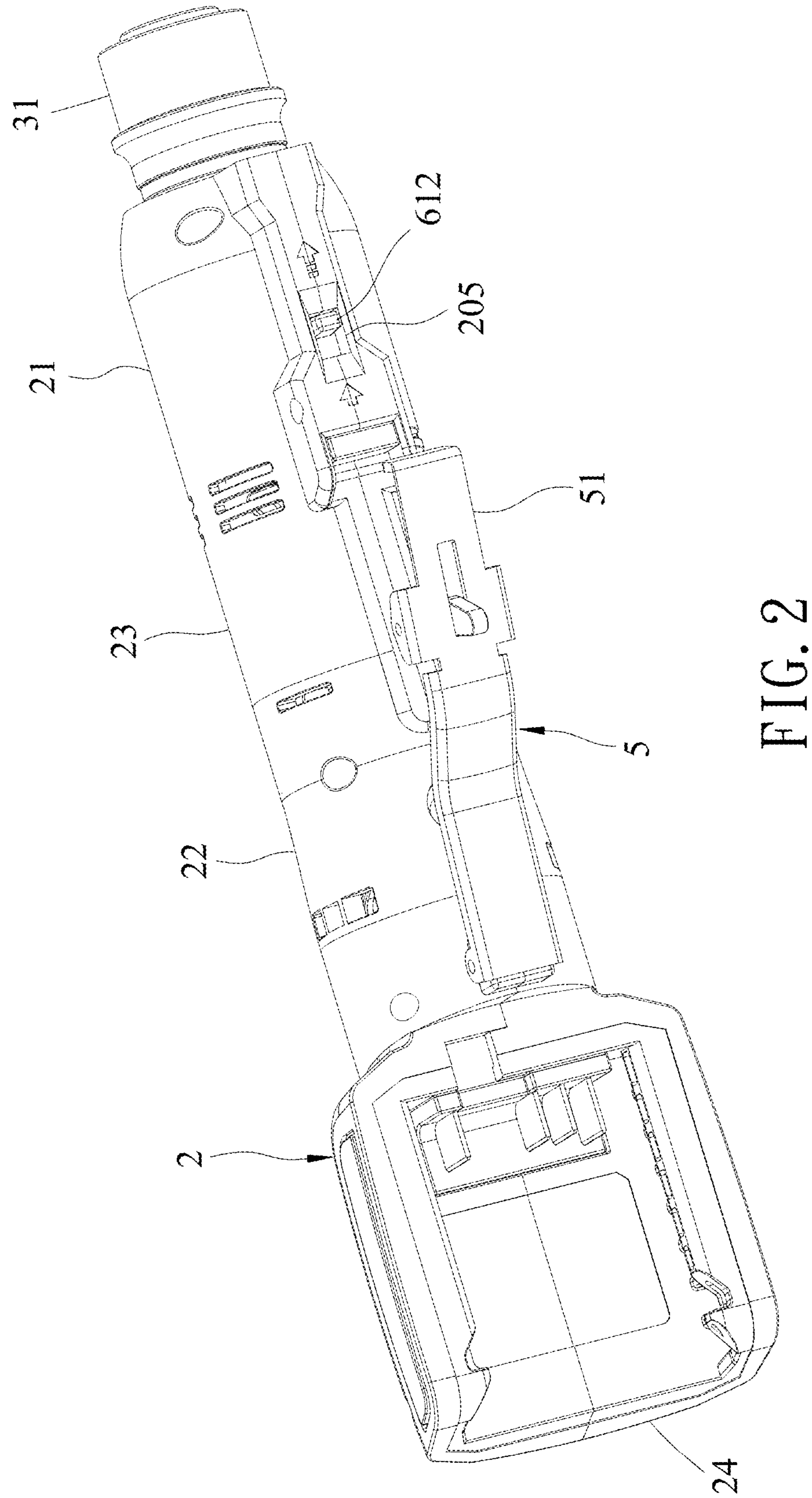
FIG. 2 is another perspective view of the embodiment seen from an angle different from FIG. 1.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Referring to FIGS. 1 to 4, an embodiment of a powered tool according to the present disclosure for repairing a tire is shown. The powered tool includes a housing unit 2, an electric power unit 3, a control unit 4, a trigger unit 5, a speed switching unit 6, and a mode switching unit 7.

The housing unit 2 extends along an axis (X). The housing unit 2 includes a front seat section 21 surrounding the axis (X) and defining a speed changing chamber 201, a rear seat section 22 surrounding the axis (X) and defining a control unit receiving chamber 202, an intermediate seat body 23 connected between the front seat section 21 and the rear seat section 22, an electrical receptacle body 24 connected to the rear seat section 22 and adapted to be electrically connected to a power source such as a battery (not shown), and two coupling portions 25. The intermediate seat body 23 surrounds the axis (X), and defines a power unit receiving chamber 203 that is in spatial communication with the speed changing chamber 201 and the control unit receiving chamber 202. The housing unit 2 defines two slide spaces 204 opposite to each other and spaced apart from the axis (X) in a direction parallel to a radial line (Y) that is substantially perpendicular to the axis (X), and two openings 205 respectively corresponding in position to the slide spaces 204. In this embodiment, one of the slide spaces 204 is formed in the front seat section 21, and another one of the slide spaces 204 is formed between the front seat section 21 and the intermediate seat body 23. Each of the openings 205 extends along the axis (X), and is in spatial communication with the respective one of the slide spaces 204 and external environment. The coupling portions 25 are formed between the front seat section 21 and the intermediate seat body 23, and are disposed in the another one of the slide spaces 204. In this embodiment, the coupling portions 25 are spaced apart from each other along the axis (X) and are opposite to each other along the radial line (Y).

The electric power unit 3 is mounted to the housing unit 2, and includes a motor 32 disposed in the power unit receiving chamber 203 and for converting electrical energy into kinetic energy, and a driven shaft 31 rotatable and adapted to output kinetic energy. In this embodiment, the driven shaft 31 is rotatably connected to the front seat section 21 and is for outputting kinetic energy transmitted from the motor 32. The motor 32 includes a rotating member 321 that is rotatable and that drives rotation of the driven shaft 31. The rear seat section 22 is distal from the driven shaft 31 along the axis (X).

The control unit 4 is disposed in the control unit receiving chamber 202 of the housing unit 2, and includes an actuating switch 41, and a processing module 42 electrically connected to the actuating switch 41 and the motor 32. The actuating switch 41 includes an actuator 411 extending outwardly of the rear seat section 22 of the housing unit 2, and movable in a direction of the radial line (Y). The actuating switch 41 is operable to output an actuated signal (S) associated with a movement distance of the actuator 411. The processing module 42 is configured to control rotation of the rotating member 321 of the motor 32 at a first rotational speed or a second rotational speed according to the actuated signal(S). In this embodiment, the processing module 42 is configured to control, according to the actuated signal(S), an amount of electricity supplied to the motor 32, or to perform a pulse-width modulation (PWM) to thereby adjusting the rotational speed of the rotating member 321. It should be noted that the processing module 42 is a microcontroller or a controller such as, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

The trigger unit 5 is mounted to the rear seat section 22 of the housing unit 2, and includes a trigger 51 operable to actuate movement of the actuator 411. In this embodiment, the trigger 51 is connected pivotally to the rear seat section 22 and is operable to contact and push the actuator 411.

Figure 3:
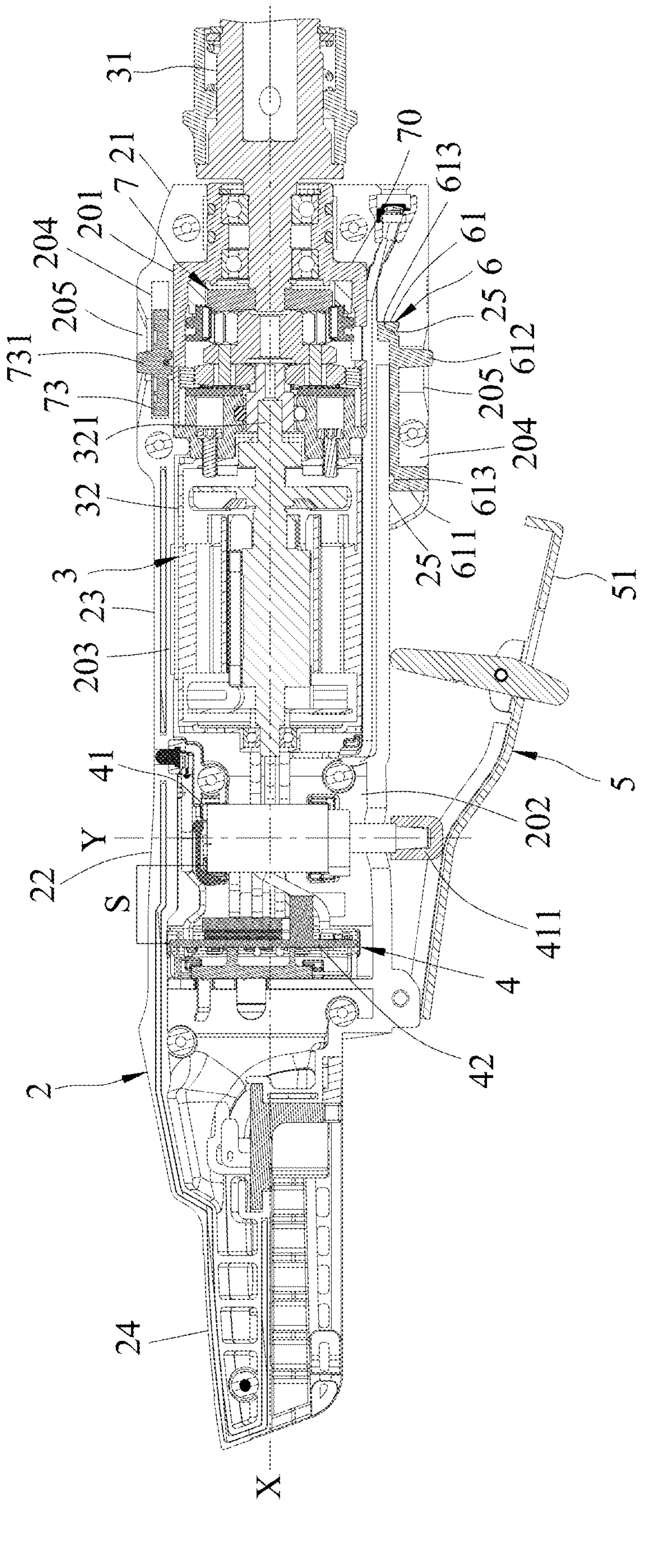
FIG. 3 is fragmentary sectional view of the embodiment, illustrating a speed changing switch of the embodiment at a first rotational speed position, a trigger of the embodiment being not pressed, and a movable gear of the embodiment being at a fixed position.
Figure 4:
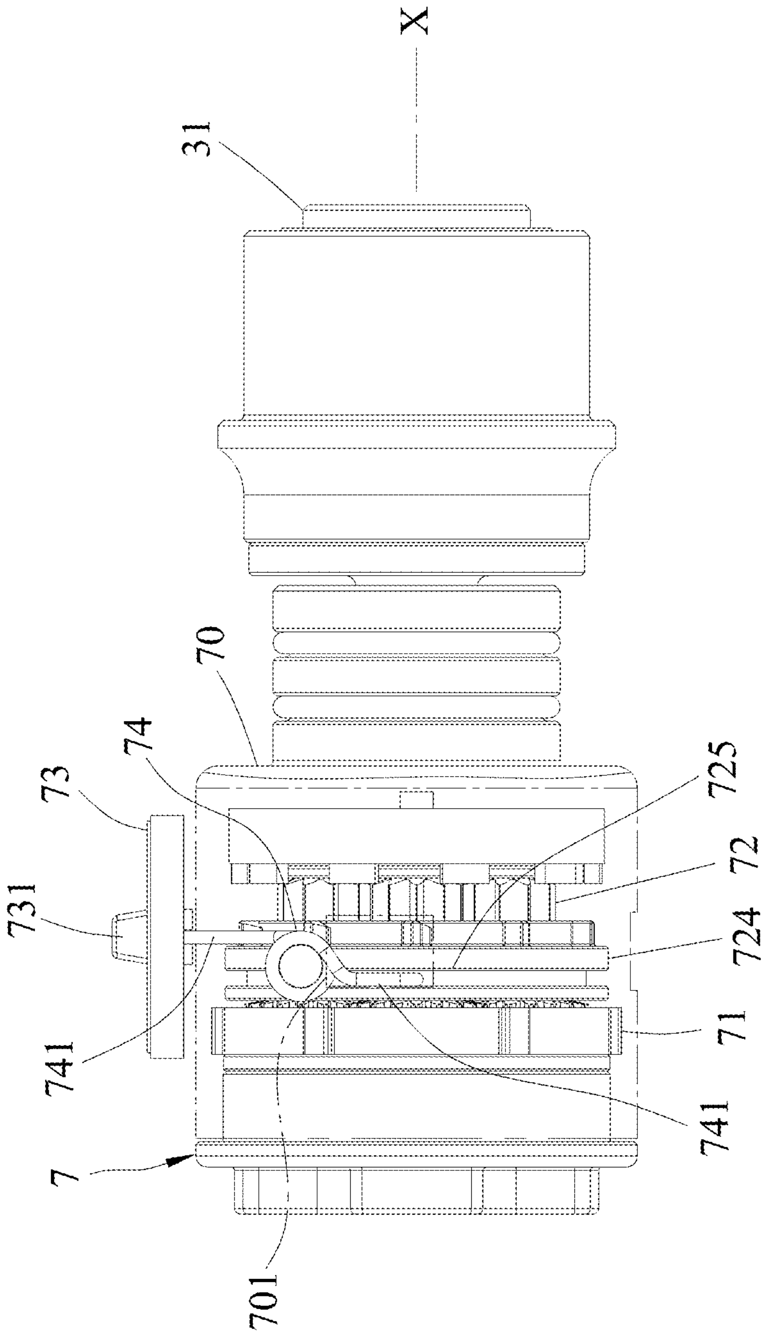
FIG. 4 is a fragmentary side view of the embodiment, illustrating a mode switching unit of the embodiment connected to the movable gear.

The speed switching unit 6 is mounted on the housing unit 2, and includes a speed changing switch 61 movable relative to the housing unit 2 in the other one of the slide spaces 204 along the axis (X). The speed changing switch 61 is operable to move relative to the trigger 51 between a first rotational speed position and a second rotational speed position, and has an abutment portion 611, an operating portion 612, and two engaging portions 613. The abutment portion 611 is proximate to the trigger 51 and extends in a direction parallel to the radial line (Y). The operating portion 612 is opposite to the abutment portion 611 along the axis (X) and is accessible to move the speed changing switch 61 between the first rotational speed position and the second rotational speed position. The engaging portions 613 are respectively complementary in shape with the coupling portions 25. Each of the coupling portions 25 may be one of a recess and a protrusion, and the respective one of the engaging portions 613 may be another one of the recess and the protrusion. The operating portion 612 extends through a lower one of the openings 205 shown in FIG. 7 in a direction parallel to the radial line (Y) and projects outwardly of the speed changing chamber 201 of the front seat section 21 of the housing unit 2. In this embodiment, the engaging portions 613 are recesses, and the coupling portions 25 are protrusions. One of the engaging portions 613 that is adjacent to the operating portion 612 faces one of the coupling portions 25 that is complementary in shape therewith. Another one of the engaging portions 613 that is adjacent to the abutment portion 611 faces another one of the coupling portions 25 that is complementary in shape therewith. As shown in FIG. 3, when the one of the engaging portions 613 that is adjacent to the operating portion 612 engages the one of the coupling portions 25, the another one of the engaging portions 613 that is adjacent to the abutment portion 611 disengages the another one of the coupling portions 25, and vice versa.

Referring to FIGS. 3, 5, 6 and 7, the speed changing switch 61 is movable relative to the trigger 51 between the first rotational speed position (see FIGS. 3 and 5) and the second rotational speed position (see FIGS. 6 and 7) along the axis (X). When the speed changing switch 61 is at the first rotational speed position, the speed changing switch 61 is distal from the trigger 51, one of the engaging portions 613 that is adjacent to the operating portion 612 engages the one of the coupling portions 25 so the speed changing switch 61 is positioned to be proximate to the driven shaft 31, such that the actuator 411 travels a first distance (d1) from a position shown in FIG. 3 to another position shown in FIG. 5 as being pushed by the trigger 51. When the speed changing switch 61 is at the second rotational speed position, the speed changing switch 61 is adjacent to the trigger 51 and is disposed between the trigger 51 and the housing unit 2, another of the engaging portions 613 that is adjacent to the abutment portion 611 engages the another one of the coupling portions 25 so the speed changing switch 61 is positioned to be distal from the driven shaft 31, such that the actuator 411 travels a second distance (d2) that is less than the first distance (d1) as being pushed by the trigger 51.

Referring to FIGS. 3, 4 and 6 and 7, the mode switching unit 7 is mounted in the speed changing chamber 201 and is configured to transmit the kinetic energy from the motor 32 to the driven shaft 31. The mode switching unit 7 includes a ring seat 70 connected to the front seat section 21 and extending into in the speed changing chamber 201, a first gear set 71 and a second gear set 72 disposed in the ring seat 70 and in the speed changing chamber 201, a mode switching unit 73 slidable in the one of the slide spaces 204 along the axis (X), and a torsion spring 74 mounted on the ring seat 70.

The ring seat 70 surrounds the axis (X), and has an through hole 701.

The first gear set 71 has a first carrier 711 spaced apart from the rotating member 321 along the axis (X), a sun gear 712 sleeved on a portion of the rotating member 321 and co-rotatably connected to the rotating member 321, a plurality of first planet gears 713 rotatably connected to the first carrier 711 and meshing with the sun gear 712, and a ring gear 714 non-rotatable and meshing with the first planet gears 713. The first carrier 711 has a sun tooth 715 opposite to the first planet gears 713 along the axis (X).

The second gear set 72 has a second carrier 721 co-rotatably connected to the driven shaft 31, a toothed ring gear 722 connected to the ring seat 70 and surrounding the second carrier 721, a plurality of second planetary gears 723 rotatably connected to the second carrier 721 and meshing with the sun tooth 715, and a movable gear 724 surrounding and meshing with the second planetary gears 723.

Referring to FIGS. 4 to 7, the movable gear 724 is annular, and has an annular groove 725 formed in an outer peripheral surface of the movable gear 724. The movable gear 724 is movable relative to the first gear set 71 along the axis (X) between a fixed position (see FIGS. 5 and 6) and a rotatable position (see FIG. 7). When the movable gear 724 is at the fixed position, the movable gear 724 is positioned, meshes with the toothed ring gear 722 and is not rotatable, and the second planetary gears 723 are rotatable relative to the movable gear 724 about the sun tooth 715, such that the mode switching unit 7 performs speed reduction at a first gear ratio. When the movable gear 724 is at the rotatable position, the movable gear 724 is rotatable, disengages and is spaced apart from the toothed ring gear 722 along the axis (X), and is driven by and rotates with the second planetary gears 723, such that the mode switching unit 7 performs speed reduction at a second gear ratio. In this embodiment, the movable gear 724 has internal gears.

Figure 7:
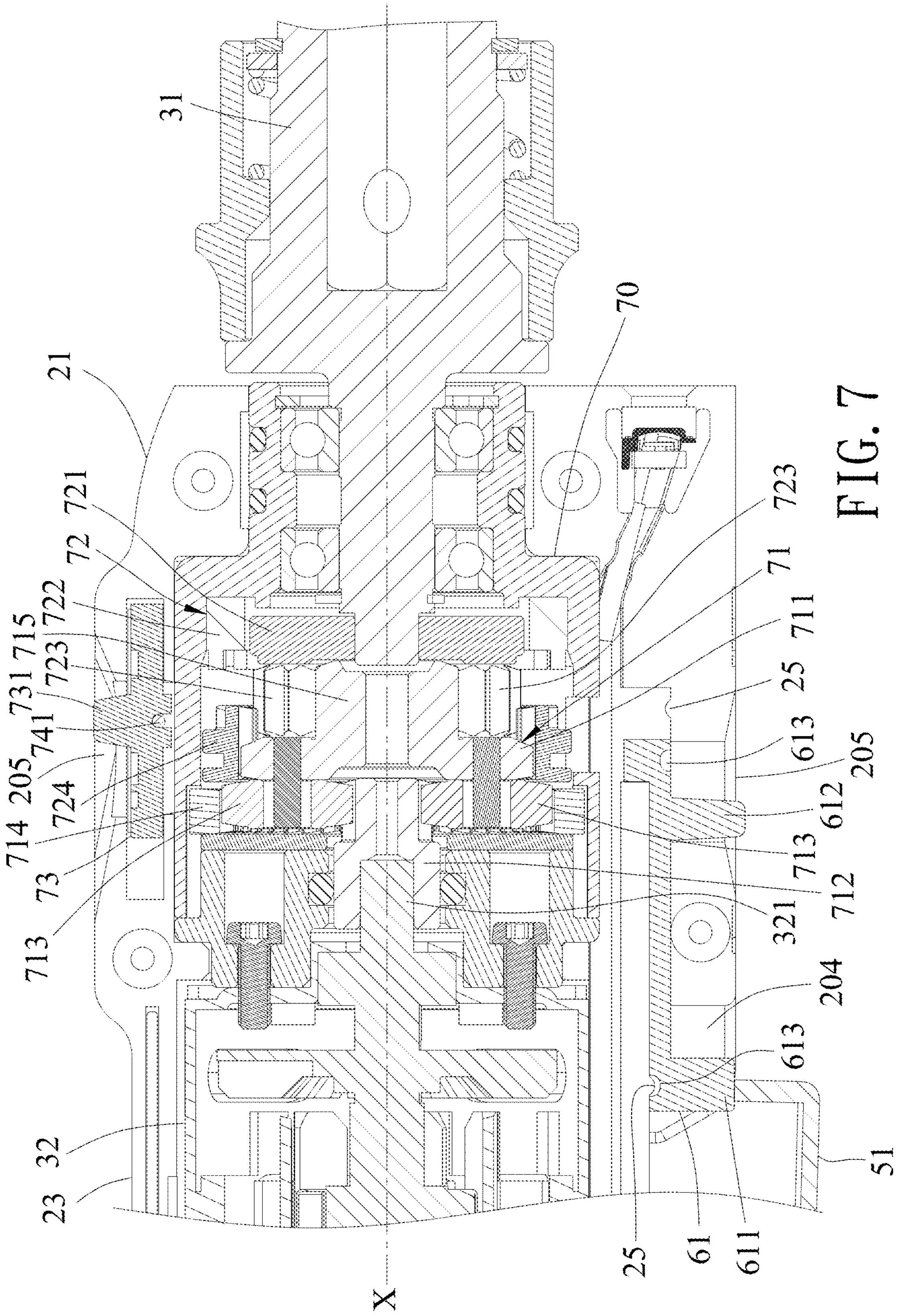
FIG. 7 is a fragmentary partly enlarged sectional view of the embodiment, illustrating the movable gear being at a rotatable position and the speed changing switch being at the second rotational speed position.

The mode switching unit 73 has an accessible portion 731 extends through an upper one of the openings 205 shown in FIG. 7 in a direction parallel to the radial line (Y).

The torsion spring 74 is rotatably connected to the ring seat 70, and has two opposite end portions 741 respectively connected to the mode switching unit 73 and the annular groove 725 of the movable gear 724. When the accessible portion 731 of the mode switching unit 73 is moved toward the driven shaft 31 and drives one of the end portions 741 to move, the movable gear 724 is driven by another one of the end portions 741 to move in an opposite direction away from the driven shaft 31 to the rotatable position, and vice versa. It should be noted herein that the one of the end portions 741 extends through the through hole 701 and engages the annular groove 725 of the movable gear 724. As such, the movable gear 724 is moved by the torsion spring 74 along the axis (X), and may rotate relative to the torsion spring 74 without being interfered by the torsion spring 74.

Figure 5:
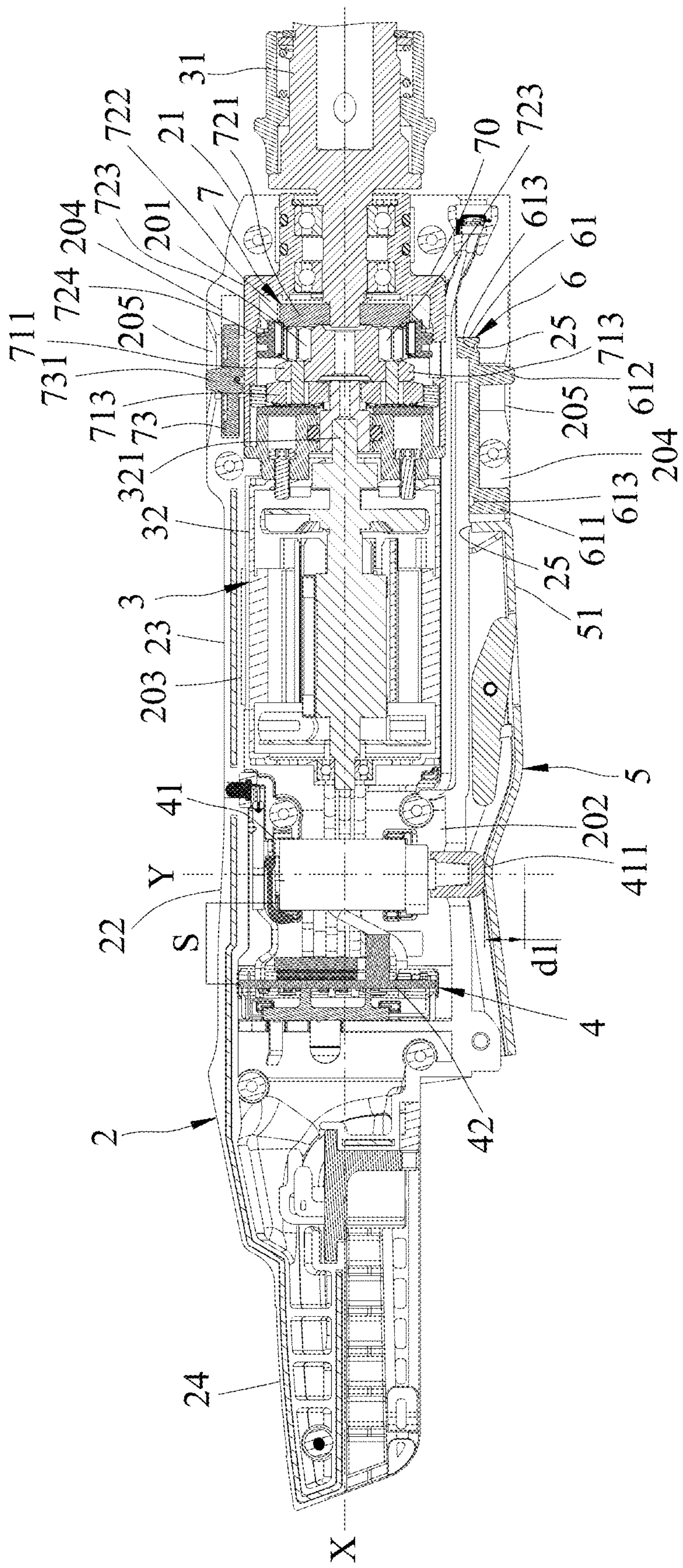
FIG. 5 is a fragmentary sectional view of the embodiment similar to FIG. 3, but illustrates that the trigger presses against a trigger.

As shown in FIGS. 3 and 5, after a user pushes the operating portion 612 of the speed changing switch 61 along the axis (X) to move the speed changing switch 61 to the first rotational speed position, the speed changing switch 61 is distal from the trigger 51 and does not limit movement of the trigger 51 toward the housing unit 2. As such, the trigger 51 may be operated to travel a relatively large distance, and the actuator 411 of the actuating switch 41 may be pushed by the trigger 51 to travel a relatively large movement distance. That is to say, the trigger 51 may press the actuator 411 of the actuating switch 41 to travel the first distance (d1), such that the actuating switch 41 outputs a first actuated signal (S1) according to the first distance (d1).

Figure 6:
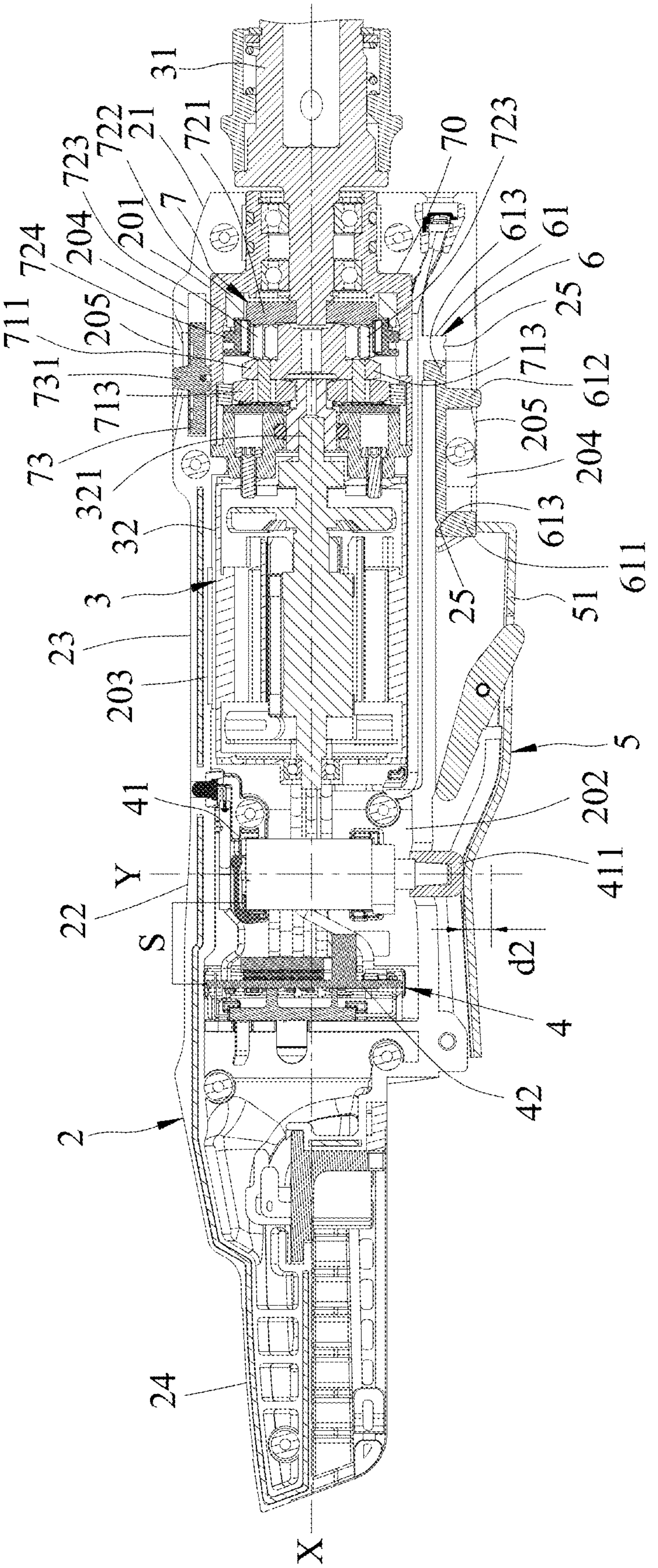
FIG. 6 is a fragmentary sectional view of the embodiment similar to FIG. 5, but illustrates that the speed changing switch is at a second rotational speed position.

As shown in FIG. 6, after the user pushes the operating portion 612 to move the speed changing switch 61 to the second rotational speed position, the abutment portion 611 is adjacent to the trigger 51 and is disposed between the trigger 51 and the housing unit 2 to limit movement of the trigger 51 toward the housing unit 2 as the trigger 51 being pushed. Thus, the trigger 51 may be operated to travel a relatively small distance, and the actuator 411 of the actuating switch 41 may be pushed by the trigger 51 to travel a relatively small movement distance. That is to say, the trigger 51 may press the actuator 411 of the actuating switch 41 to travel the second distance (d2), such that the actuating switch 41 outputs a second actuated signal (S2) according to the second distance (d2).

In this way, the processing module 42 controls the rotating member 321 of the motor 32 to rotate at a first rotational speed and a second rotational speed according to the first actuated signal (S1) and the second actuated signal (S2), respectively.

When the movable gear 724 is at the fixed position and is not rotatable, and the rotating member 321 of the motor 32 rotates at one of the first rotational speed (see FIG. 5) and the second rotational speed (see FIG. 6), the first planet gears 713 driven by the sun gear 712 rotates relative to the movable gear 724 while revolving about the axis (X), and drive the first carrier 711 to rotate. At this time, the sun tooth 715 of the first carrier 711 is rotated to drive rotation of the second planetary gears 723 so that the second planetary gears 723 rotates relative to the movable gear 724 and revolves about the axis (X), and drive rotation of the second carrier 721. Thus, during rotation of the second carrier 721, the driven shaft 31 is driven to rotate at a first rotational output speed and a second rotational output speed that are respectively decelerated from the first rotational speed and the second rotational speed by the first gear ratio.

It should be noted that the user may operate the accessible portion 731 of the mode switching unit 73 along the axis (X) to move the movable gear 724 to the rotatable position through the torsion spring 74 when the speed changing switch 61 is at one of the first rotational speed position (not shown) and the second rotational speed position (see FIG. 7). At this position, the movable gear 724 disengages the toothed ring gear 722 and is driven by the second planetary gears 723 that is driven by the sun tooth 715 of the first carrier 711 to rotate about the axis (X), and the second planetary gears 723 drives rotation of the second carrier 721. Thus, during rotation of the second carrier 721, the driven shaft 31 is driven to rotate at a third rotational output speed and a fourth rotational output speed respectively decelerated from the first rotational speed and the second rotational speed by the second gear ratio.

As described above, the driven shaft 31 is driven to rotate at the first, second, third and fourth rotational output speeds by adjusting positions of the speed changing switch 61 and the mode switching unit 73, and may be connected to various tool heads (not shown) for cleaning, grinding, or polishing a damaged region of a tire to be repaired (not shown) to thereby facilitate repair and maintenance of the tire. For example, a patch (not shown) may be securely bonded to the damaged area of the tire.

It should be noted that, in the above descriptions, the positions of the speed changing switch 61 and the mode switching unit 73 are independently adjusted and may be adjusted together in some variations of the embodiment according to the present disclosure. For example, the speed changing switch 61 is co-movable with the mode switching unit 73 and thus the operation to the mode switching unit 73 along the axis (X) to the fixed position or the rotatable position drives movement of the speed changing switch 61 along the axis (X) to the first rotational speed position or the second rotational speed position.

Figure 8:
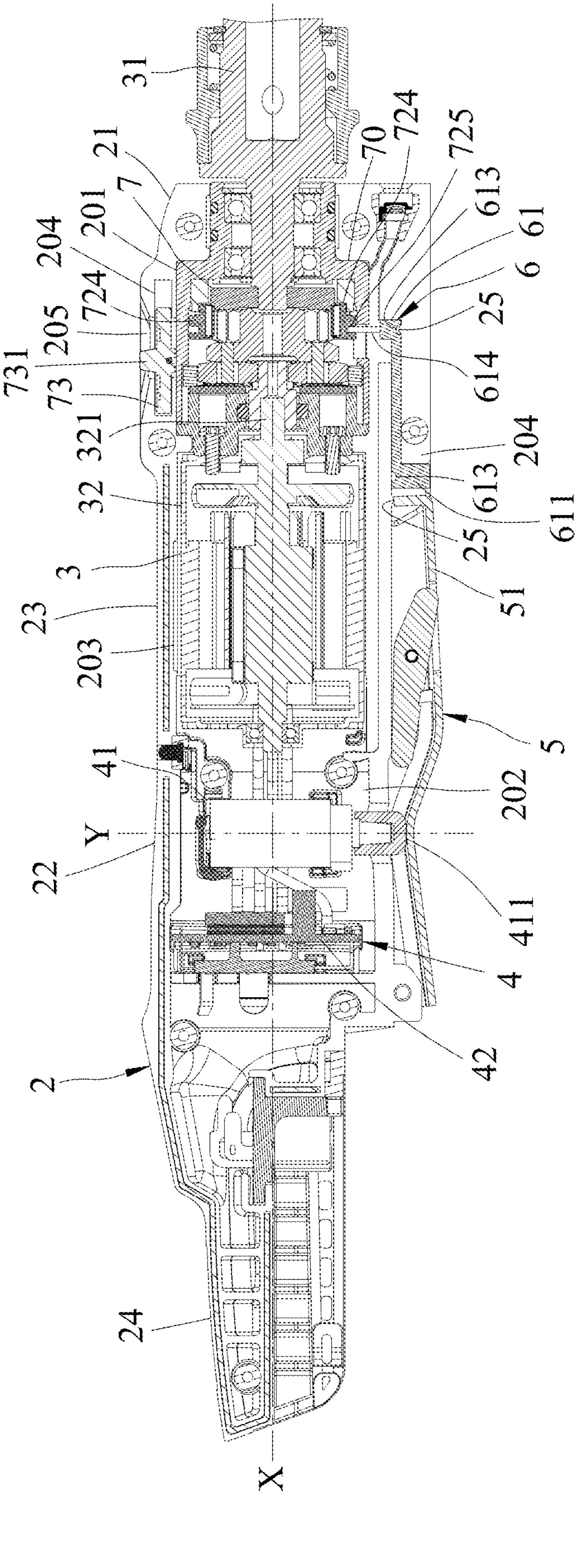
FIG. 8 is a fragmentary sectional view of the embodiment, illustrating a variation of the speed changing switch of the embodiment.

Referring to FIG. 8, a variation of the speed changing switch 61 is illustrated. In this variation, the speed changing switch 61 further has a linkage portion 614 extending toward the movable gear 724. The linkage portion 614 extends through the ring seat 70 and engages the annular groove 725 (not visible in FIG. 8) of the movable gear 724 such that the movable gear 724 is co-movable with the speed changing switch 61 along the axis (X) and is rotatable relative to the linkage portion 614 of the speed changing switch 61. Thus, the movable gear 724 and the speed changing switch 61 are both driven by movement of the mode switching unit 73 along the axis (X).

Figure 9:
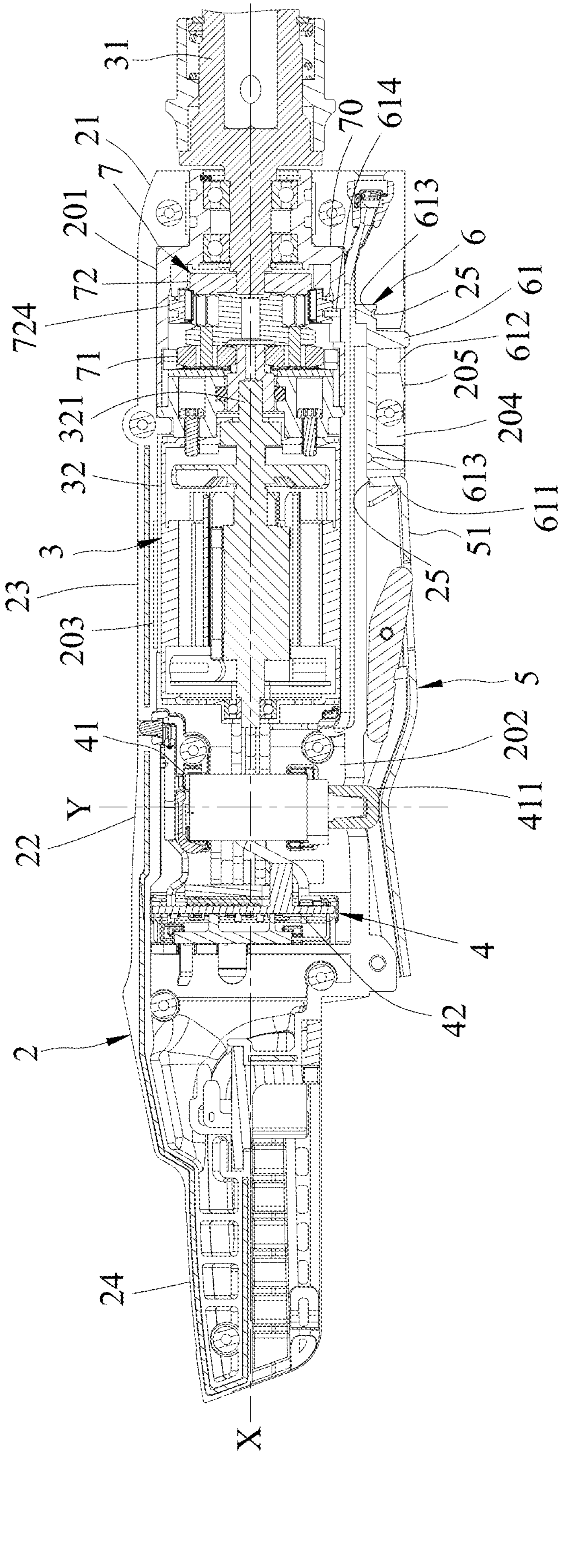
FIG. 9 fragmentary sectional view of a modification of the embodiment, illustrating the mode switching unit being omitted, and the speed changing switch being at the first rotational speed position.
Figure 10:
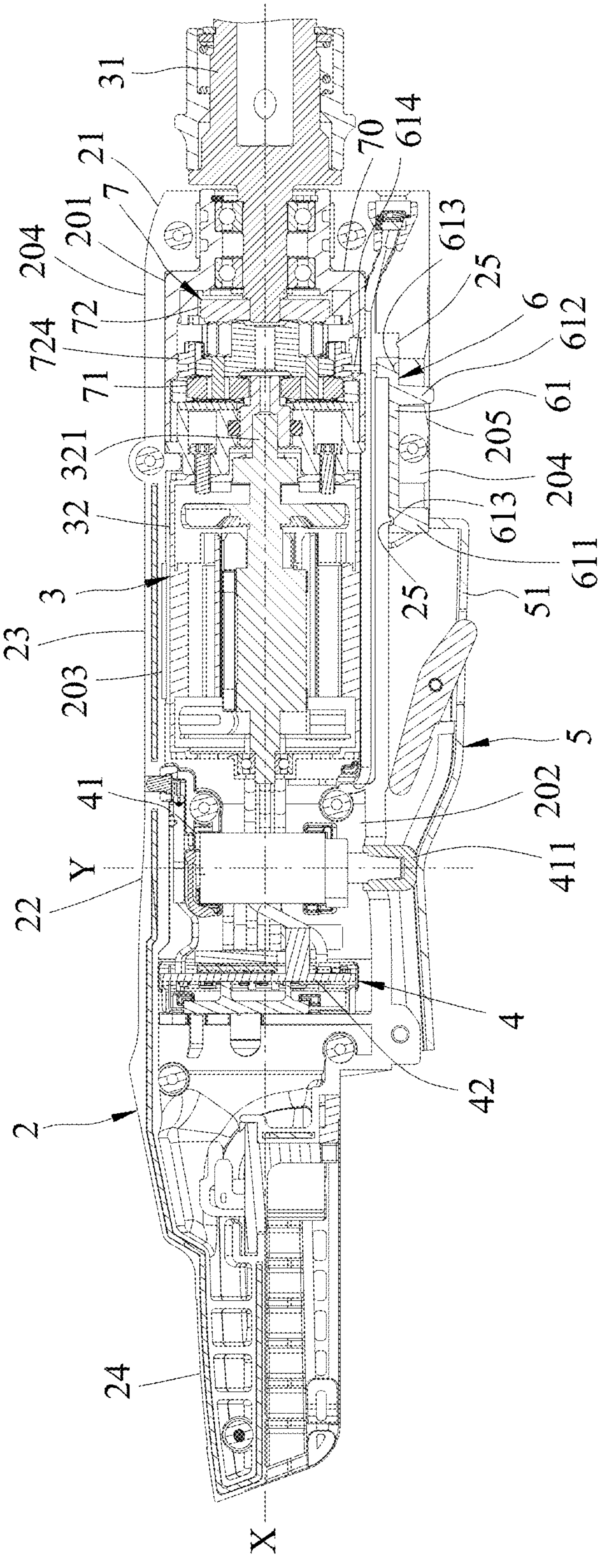
FIG. 10 is fragmentary sectional view of the modification of the embodiment, illustrating the speed changing switch being at the second rotational speed position.

As described in the variation shown in FIG. 8, the present disclosure is not limited to independently change the speed changing switch 61 and the mode switching unit 73 to change rotational output speed of the driven shaft 31. For example, FIGS. 9 and 10 show a modification of the variation of the embodiment shown in FIG. 8, in which the mode switching unit 73 and the one of the slide spaces 204 shown in FIG. 8 are omitted. In this modification, movement of the speed changing switch 61 to the first rotational speed position or the second rotational speed position drives movement of the movable gear 724 through the linkage portion 614 to the fixed position or the rotatable position. In this modification, the mode switching unit 7 also performs speed reduction by the first gear ratio (see FIG. 9) and the second gear ratio (see FIG. 10) to drive rotation of the driven shaft 31 at the first rotational output speed and the fourth rotational output speed.

Through the above description, the advantages of the embodiment can be summarized as follows.

First, the gear ratio of the mode switching unit 7 may be changed through movement of the movable gear 724 along the axis (X). By virtue of the cooperation of the movements of the movable gear 724 and the speed changing switch 61, the driven shaft 31 of the present disclosure may be driven to rotate at first, second, third and fourth rotational output speeds, thereby providing more rotational output speeds without a use of an electronic speed control system. In addition, connections among the trigger unit 5 and the speed switching unit 6 are simple mechanical structures and are thus not susceptible to loosen easily, which improves reliability of the powered tool of the present disclosure.

Second, in the embodiment of the present disclosure, the mode switching unit 73 may be operated to drive movement of the speed changing switch 61 to the first rotational speed position and the second rotational speed position through the linkage portion 614 that engages the movable gear 724, so that distances that the trigger 51 and thus the actuator 411 may travel are changed.

Third, in a case where the mode switching unit 73 is omitted, the movable gear 724 may also be moved between the fixed position and the rotatable position by moving the speed changing switch 61 along the axis (X).

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A powered tool for repairing a tire, comprising:

a housing unit that extends along an axis;

an electric power unit that is mounted to said housing unit and that includes
  a driven shaft rotatable and adapted to output kinetic energy, and
  a motor for converting electrical energy into kinetic energy, and including a rotating member that is rotatable and that drives rotation of said driven shaft;

a control unit that is mounted to said housing unit, and that includes
  an actuating switch including an actuator that is movable, said actuating switch being operable to output an actuated signal that is associated with a movement distance of said actuator, and
  a processing module electrically connected to said actuating switch and said motor, and configured to control rotation of said rotating member of said motor at one of a first rotational speed and a second rotational speed according to the actuated signal;

a trigger unit that is mounted to said housing unit and that includes a trigger operable to actuate movement of said actuator; and a speed switching unit that is mounted on said housing unit and that includes a speed changing switch operable to move relative to said trigger between a first rotational speed position and a second rotational speed position, said speed changing switch being distal from said trigger when being at the first rotational speed position such that said actuator travels a first distance as being pushed by said trigger, said speed changing switch being adjacent to said trigger and disposed between said trigger and said housing unit when being at the second rotational speed position such that said actuator travels a second distance that is smaller than said first distance as being pushed by said trigger.

2. The powered tool as claimed in claim 1, wherein said speed changing switch is movable relative to said housing unit along the axis, and has:

an abutment portion proximate to said trigger, said abutment portion being in contact with said trigger, and disposed between said trigger and said housing unit when said speed changing switch is at the second rotational speed position; and an operating portion opposite to said abutment portion along the axis and accessible to move said speed changing switch between the first rotational speed position and the second rotational speed position.

3. The powered tool as claimed in claim 2, wherein said housing unit includes:

a rear seat section surrounding the axis, distal from said driven shaft, and defining a control unit receiving chamber in which said control unit is disposed; and an intermediate seat body surrounding the axis, connected to said rear seat section, and defining a power unit receiving chamber in which said motor is disposed.

4. The powered tool as claimed in claim 3, wherein:

said housing unit defines a slide space spaced apart from the axis in a direction parallel to a radial line that is substantially perpendicular to the axis, and an opening extending along the axis and in spatial communication with said slide space and external environment;

said speed changing switch is slidable in said slide space along the axis;

said abutment portion extends in a direction parallel to the radial line; and said operating portion extends through said opening in a direction parallel to the radial line.

5. The powered tool as claimed in claim 4, wherein:

said housing unit has two coupling portions disposed in said slide space, spaced apart from each other along the axis, and opposite to each other along the radial line, said speed changing switch further has two engaging portions respectively complementary in shape with said coupling portions, one of said engaging portions that is adjacent to said operating portion engaging one of said coupling portions when said speed changing switch is at the first rotational speed position, another one of said engaging portions that is adjacent to said abutment portion engaging another one of said coupling portions when said speed changing switch is at the second rotational speed position.

6. The powered tool as claimed in claim 1, further comprising:

a mode switching unit that is configured to transmit kinetic energy from said motor to said driven shaft, that is mounted to said housing unit, and that includes a first gear set, and a second gear set including a movable gear that is driven to move relative to said first gear set along the axis between a fixed position, where said movable gear is positioned, and a rotatable position, where said movable gear is rotatable.

7. The powered tool as claimed in claim 6, wherein said first gear set has a first carrier spaced apart from said rotating member, a sun gear co-rotatably connected to said rotating member, a plurality of first planet gears rotatably connected to said first carrier and meshing with said sun gear, and a ring gear non-rotatable and meshing with said first planet gears, said first carrier having a sun tooth opposite to said first planet gears along the axis.

8. The powered tool as claimed in claim 7, wherein:

said movable gear is annular;

said second gear set further includes a second carrier co-rotatably connected to said driven shaft, and a plurality of second planetary gears rotatably connected to said second carrier, meshing with said sun tooth, and meshing with and surrounded by said movable gear, said second planetary gears rotatable relative to the movable gear about said sun tooth when said movable gear being at the fixed position where said movable gear is non-rotatable; and said movable gear is driven by and rotating with said second planetary gears when said movable gear is at the rotatable position.

9. The powered tool as claimed in claim 6, wherein:

said second gear set further includes a toothed ring gear;

said movable gear meshes with said toothed ring gear and is not rotatable when being at the fixed position; and said movable gear disengages said toothed ring gear along the axis when being at the rotatable position.

10. The powered tool as claimed in claim 6, wherein:

said housing unit includes a front seat section surrounding the axis and defining a speed changing chamber;

said driven shaft is rotatably connected to said front seat section; and said first gear set and said second gear set of said mode switching unit are disposed in said speed changing chamber.

11. The powered tool as claimed in claim 10, wherein:

said housing unit defines a slide space spaced apart from said speed changing chamber in a direction parallel to a radial line that is substantially perpendicular to the axis, and an opening extending along the axis and in spatial communication with said slide space and external environment; and said mode switching unit further includes a mode switching unit slidable in said slide space along the axis, connected to said movable gear, and having an accessible portion that extends through said opening in a direction parallel to the radial line.

12. The powered tool as claimed in claim 11, wherein:

said mode switching unit further includes a ring seat connected to said front seat section, extending into said speed changing chamber, and has a through hole, said first gear set and said second gear set being disposed in said ring seat, and a torsion spring mounted on said ring seat, having two opposite end portions that respectively connected to said mode switching unit and said movable gear; and said movable gear has an annular groove formed in an outer peripheral surface of said movable gear and engaging one of said end portions that extends through said through hole and that is connected to said movable gear.

13. The powered tool as claimed in claim 6, wherein:

said speed changing switch has a linkage portion extending toward said movable gear;

said movable gear has an annular groove formed in an outer peripheral surface of said movable gear and engaging said linkage portion; and said movable gear is co-movable with said speed changing switch along the axis and is rotatable relative to said linkage portion.

* * * * *